(12) United States Patent
Kim et al.

(10) Patent No.: US 12,415,511 B2
(45) Date of Patent: Sep. 16, 2025

(54) SYSTEM AND METHOD FOR TARGET BEHAVIOR PREDICTION IN ADVANCED DRIVING ASSIST SYSTEM (ADAS), AUTONOMOUS DRIVING (AD), OR OTHER APPLICATIONS

(71) Applicant: Canoo Technologies Inc., Torrance, CA (US)

(72) Inventors: Kilsoo Kim, Hermosa Beach, CA (US); Jongmoo Choi, Gardena, CA (US); Shanmukha M. Bhumireddy, Torrance, CA (US); Emilio Aron Moyers Barrera, Bloomfield Hills, MI (US); Phillip Vu, Calabasas, CA (US); Rishitha Kalakata, Torrance, CA (US)

(73) Assignee: CANOO TECHNOLOGIES INC., Torrence, CA (US)

( * ) Notice: Subject to any disclaimer, the term of this patent is extended or adjusted under 35 U.S.C. 154(b) by 62 days.

(21) Appl. No.: 18/052,124

(22) Filed: Nov. 2, 2022

(65) Prior Publication Data
US 2024/0140414 A1    May 2, 2024

(51) Int. Cl.
*B60W 30/095*    (2012.01)
*B60W 30/09*    (2012.01)
(Continued)

(52) U.S. Cl.
CPC ........ *B60W 30/0956* (2013.01); *B60W 30/09* (2013.01); *B60W 50/16* (2013.01);
(Continued)

(58) Field of Classification Search
CPC ...... B60W 10/18; B60W 10/20; B60W 30/09; B60W 30/095; B60W 30/0956;
(Continued)

(56) References Cited

U.S. PATENT DOCUMENTS

| 5,638,281 A | 6/1997 | Wang |
| 2002/0049539 A1 | 4/2002 | Russell et al. |

(Continued)

FOREIGN PATENT DOCUMENTS

| CA | 2884808 C | * 5/2019 | ............ B60W 10/18 |
| EP | 4067186 A1 | * 10/2022 | .......... B60W 30/085 |

(Continued)

OTHER PUBLICATIONS

Kim et al., "Vehicle Motion Control Using Torque Vectoring With Consideration Of Driver Intent And Load Transfer," U.S. Appl. No. 17/935,632, filed Sep. 27, 2022, 48 pages.

(Continued)

*Primary Examiner* — Atul Trivedi
(74) *Attorney, Agent, or Firm* — ALLEN, DYER, DOPPELT, + GILCHRIST, P.A.

(57) ABSTRACT

A method includes obtaining sensor data associated with a target object at a host vehicle and identifying relative positions of the target object with reference to the host vehicle over time. The method also includes generating polynomials associated with the target object over time based on the relative positions, where coefficients of each polynomial are based on a magnitude of a covariance of the relative positions used to generate the polynomial. The method further includes generating a weighted combination of the polynomials for the target object, where the weighted combination is a representation of an estimated behavior of the target object. In addition, the method includes determining whether a collision between the host vehicle and the target object is possible based on the weighted combination of the polynomials and, in response to determining that the collision is possible, initiating one or more corrective actions by the host vehicle.

24 Claims, 7 Drawing Sheets

(51) Int. Cl.
     *B60W 50/16*    (2020.01)
     *B60W 60/00*    (2020.01)
(52) U.S. Cl.
     CPC ... *B60W 60/001* (2020.02); *B60W 2554/4041* (2020.02); *B60W 2554/4046* (2020.02)
(58) Field of Classification Search
     CPC ............ B60W 50/16; B60W 60/001; B60W 60/00272; B60W 2554/4041; B60W 2554/4046; B60W 2554/80; B60W 2556/10
     USPC .......................................................... 701/23
     See application file for complete search history.

(56) References Cited

U.S. PATENT DOCUMENTS

| | | | |
|---|---|---|---|
| 2005/0225477 A1* | 10/2005 | Cong ................ | B60K 31/0083 342/72 |
| 2009/0192710 A1 | 7/2009 | Eidehall et al. | |
| 2011/0071731 A1* | 3/2011 | Eidehall ............ | B60W 30/0956 701/42 |
| 2018/0251092 A1 | 9/2018 | Lee et al. | |
| 2018/0257660 A1* | 9/2018 | Ibrahim ................ | G01S 5/0027 |
| 2018/0293893 A1* | 10/2018 | Yang ............... | B60W 30/18036 |
| 2019/0050136 A1* | 2/2019 | Alfano .................... | B64G 99/00 |
| 2019/0193275 A1 | 6/2019 | Tan et al. | |
| 2020/0043186 A1 | 2/2020 | Selviah et al. | |
| 2020/0049511 A1 | 2/2020 | Sithiravel et al. | |
| 2020/0369296 A1* | 11/2020 | Kim .................. | B60W 60/0027 |
| 2021/0053560 A1* | 2/2021 | Haddad ............... | B60W 30/095 |
| 2021/0163010 A1* | 6/2021 | Takabayashi ............ | G08G 1/16 |
| 2021/0272466 A1* | 9/2021 | Ahn ...................... | G08G 5/0078 |
| 2023/0089978 A1 | 3/2023 | Pulver et al. | |
| 2023/0103248 A1 | 3/2023 | Abrash et al. | |
| 2023/0331218 A1* | 10/2023 | Choi ..................... | B60W 10/20 |
| 2023/0347882 A1 | 11/2023 | Tian et al. | |
| 2024/0010232 A1* | 1/2024 | Karkus ................. | G06N 3/045 |
| 2024/0059285 A1* | 2/2024 | Ng ........................ | B60W 50/14 |

FOREIGN PATENT DOCUMENTS

| | | | | |
|---|---|---|---|---|
| GB | 2597264 A | | 1/2022 | |
| WO | WO-2021020311 A1 * | | 2/2021 | ............ B60W 10/04 |

OTHER PUBLICATIONS

Choi et al., "Proximity Detection For Automotive Vehicles and Other Systems Based On Probabilistic Computing Techniques," U.S. Appl. No. 17/366,866, filed Jul. 2, 2021, 35 pages.

Kim et al., "System And Method In Vehicle Path Prediction Based On Odometry And Inertial Measurement Unit," U.S. Appl. No. 17/449,623, filed Sep. 30, 2021, 40 pages.

Kim et al., "System And Method For Target Behavior Prediction Using Host Prediction In Advanced Driving Assist System (ADAS), Autonomous Driving (AD), Or Other Applications," U.S. Appl. No. 18/052,122, filed Nov. 2, 2022, 45 pages.

International Search Report and Written Opinion of the International Searching Authority dated Oct. 19, 2022 in connection with International Patent Application No. PCT/US22/32523, 7 pages.

Ahangar, "Introduction to Statistical Geometry," Proceedings of the 2010 International Conference on Scientific Computing, Jul. 2010, 6 pages.

Ahangar, "Harmonic Probability Density Function, Modeling, and Regression," European International Journal of Science and Technology, vol. 2, No. 5, Jun. 2013, 9 pages.

Maesschalck et al., "The Mahalanobis distance," Chemometrics and Intelligent Laboratory System, vol. 50, 2000, 18 pages.

Mahalanobis, "On the Generalized Distance in Statistics," vol. II, No. 1, Apr. 1936, 7 pages.

Schweppe, "On the Bhattacharyya Distance and the Divergence between Gaussian Processes," Information and Control, vol. 11, 1967, 23 pages.

International Search Report and Written Opinion of the International Searching Authority dated Nov. 13, 2023, in connection with International Application No. PCT/US2023/071210, 8 pages.

International Search Report and Written Opinion of the International Searching Authority dated Nov. 3, 2023, in connection with International Application No. PCT/US2023/028979, 14 pages.

Brunton, et al., "Supporting Information for: Discovering governing equations from data: Sparse identification of nonlinear dynamical systems," Proceedings of the National Academy of Sciences, Mar. 2016, 76 pages.

Non-final Office Action dated Aug. 21, 2024, in connection with U.S. Appl. No. 18/052,122, 31 pages.

* cited by examiner

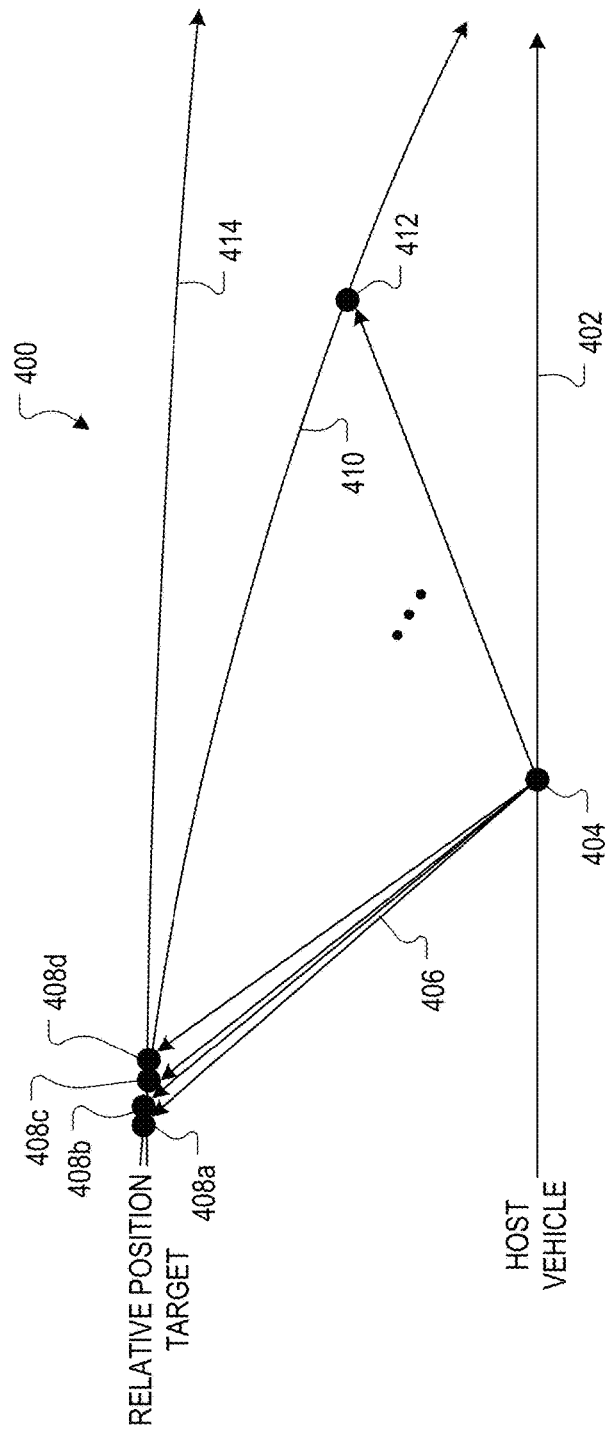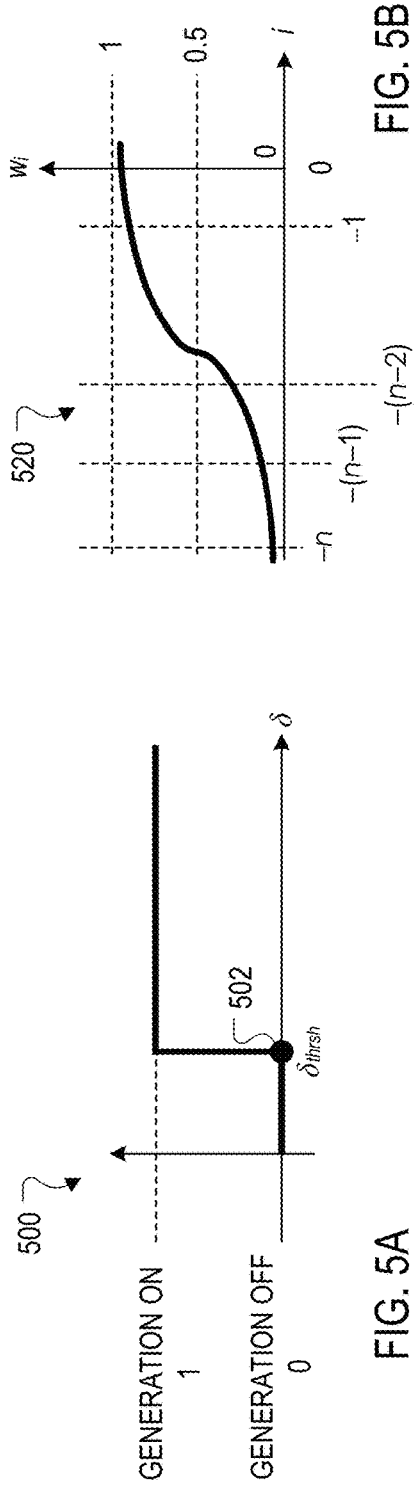
FIG. 4
FIG. 5A
FIG. 5B

SYSTEM AND METHOD FOR TARGET BEHAVIOR PREDICTION IN ADVANCED DRIVING ASSIST SYSTEM (ADAS), AUTONOMOUS DRIVING (AD), OR OTHER APPLICATIONS

TECHNICAL FIELD

This disclosure relates generally to prediction systems. More specifically, this disclosure relates to a system and method for target behavior prediction in advanced driving assist system (ADAS), autonomous driving (AD), or other applications.

BACKGROUND

Various automotive applications have been developed that process input data from sensors or other sources and control operations of vehicles based on the input data. For example, in an advanced driving assist system (ADAS) or autonomous driving (AD) application, information from one or more sensors (such as one or more cameras) can be processed in order to identify objects (such as other vehicles) around a specific vehicle (often referred to as an "ego vehicle"). The identified objects may then be used for control purposes or other purposes, such as to adjust the speed or direction of travel of the ego vehicle or to alert an operator of the ego vehicle.

SUMMARY

This disclosure relates to a system and method for target behavior prediction in advanced driving assist system (ADAS), autonomous driving (AD), or other applications.

In a first embodiment, a method includes obtaining sensor data associated with a target object at a host vehicle and identifying relative positions of the target object with reference to the host vehicle over time. The method also includes generating polynomials associated with the target object over time based on the relative positions of the target object, where coefficients of each polynomial are based on a magnitude of a covariance of the relative positions of the target object used to generate the polynomial. The method further includes generating a weighted combination of the polynomials for the target object, where the weighted combination is a representation of an estimated behavior of the target object. In addition, the method includes determining whether a collision between the host vehicle and the target object is possible based on the weighted combination of the polynomials and, in response to determining that the collision between the host vehicle and the target object is possible, initiating one or more corrective actions by the host vehicle.

In a second embodiment, an apparatus includes at least one processing device configured to obtain sensor data associated with a target object at a host vehicle and identify relative positions of the target object with reference to the host vehicle over time. The at least one processing device is also configured to generate polynomials associated with the target object over time based on the relative positions of the target object, where coefficients of each polynomial are based on a magnitude of a covariance of the relative positions of the target object used to generate the polynomial. The at least one processing device is further configured to generate a weighted combination of the polynomials for the target object, where the weighted combination is a representation of an estimated behavior of the target object. In addition, the at least one processing device is configured to determine whether a collision between the host vehicle and the target object is possible based on the weighted combination of the polynomials and, in response to determining that the collision between the host vehicle and the target object is possible, initiate one or more corrective actions by the host vehicle.

In a third embodiment, a non-transitory machine-readable medium contains instructions that when executed cause at least one processing device of a host vehicle to obtain sensor data associated with a target object and identify relative positions of the target object with reference to the host vehicle over time. The non-transitory machine-readable medium also contains instructions that when executed cause the at least one processing device to generate polynomials associated with the target object over time based on the relative positions of the target object, where coefficients of each polynomial are based on a magnitude of a covariance of the relative positions of the target object used to generate the polynomial. The non-transitory machine-readable medium further contains instructions that when executed cause the at least one processing device to generate a weighted combination of the polynomials for the target object, where the weighted combination is a representation of an estimated behavior of the target object. In addition, the non-transitory machine-readable medium contains instructions that when executed cause the at least one processing device to determine whether a collision between the host vehicle and the target object is possible based on the weighted combination of the polynomials and, in response to determining that the collision between the host vehicle and the target object is possible, initiate one or more corrective actions by the host vehicle.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts:

FIGS. 3 and 4 illustrate examples of performing target behavior prediction under steady and non-steady relative motions according to this disclosure;

FIGS. 5A and 5B illustrate example approaches for polynomial generation and weighted summing for use during target behavior prediction according to this disclosure;

DETAILED DESCRIPTION

Figure 1:
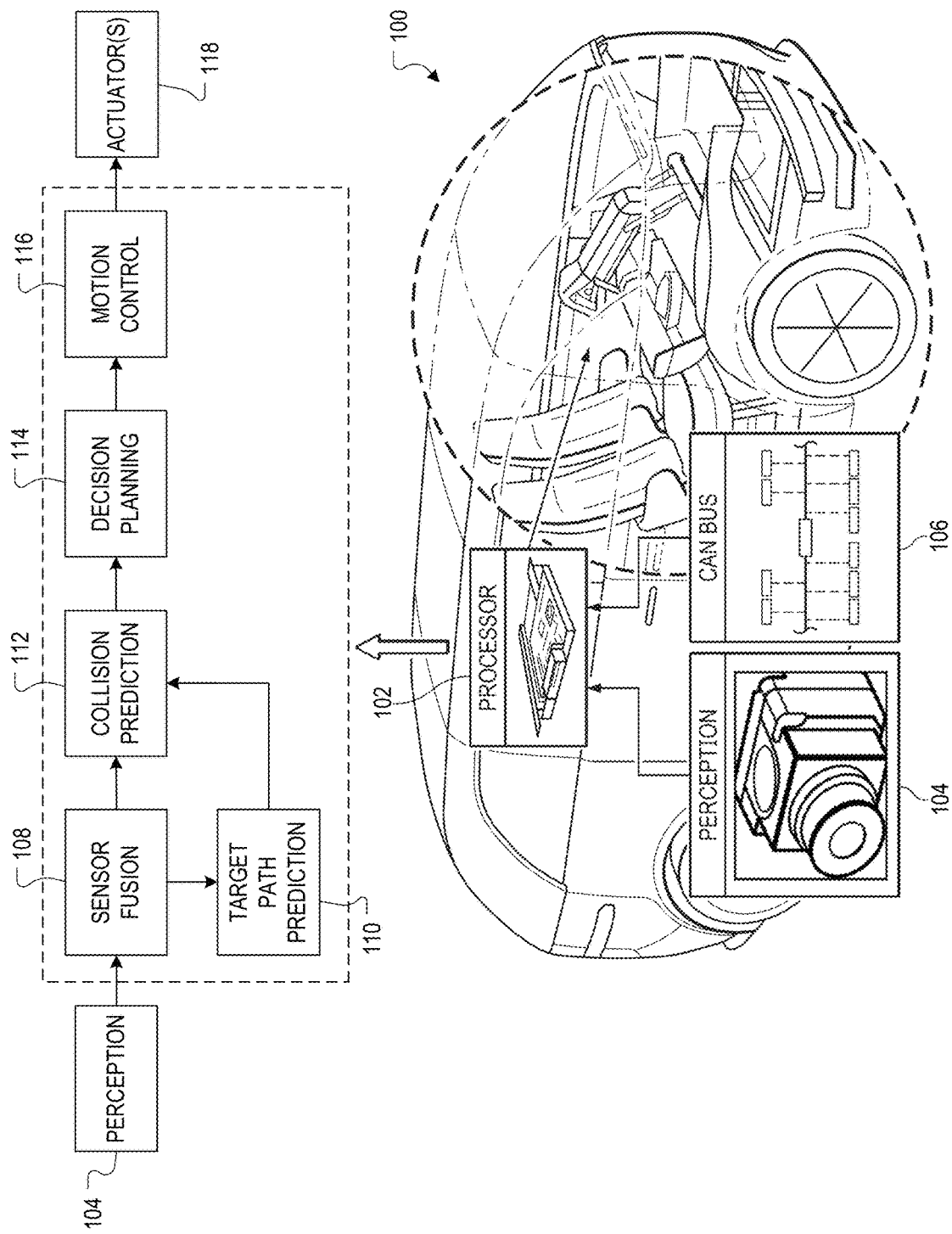
FIG. 1 illustrates an example system supporting target behavior prediction according to this disclosure.

FIGS. 1 through 9, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

As noted above, various automotive applications have been developed that process input data from sensors or other sources and control operations of vehicles based on the input data. For example, in an advanced driving assist system (ADAS) or autonomous driving (AD) application, information from one or more sensors (such as one or more cameras) can be processed in order to identify objects (such as other vehicles) around a specific vehicle (often referred to as an "ego vehicle"). The identified objects may then be used for control purposes or other purposes, such as to adjust the speed or direction of travel of the ego vehicle or to alert an operator of the ego vehicle.

As a particular example of this, target behavior prediction generally involves identifying target objects around an ego vehicle and predicting how the target objects may behave in the future, such as by predicting how the target objects may move relative to the ego vehicle in the future. Accurate target behavior prediction may be extremely useful or important in a number of applications, such as in ADAS and AD applications where the control of an ego vehicle can depend heavily on predicted behaviors of vehicles or other objects around the ego vehicle. Unfortunately, real-world conditions are highly variable, and it can be difficult to perform target behavior prediction effectively across a wide range of real-world conditions.

This disclosure provides various techniques for performing target behavior prediction. As described in more detail below, an ADAS/AD system or other system can be used to identify positions of a target object relative to an ego vehicle over time. This information represents tracking information, and the tracking information can be used along with covariance information in order to generate a polynomial associated with an estimated path of the target object. This can be repeated over time as additional positions of the target object relative to the ego vehicle are obtained, and this process can be performed for each target object. As a result, multiple polynomials associated with each target object can be generated over time.

Collision prediction can be performed based on the generated polynomials. For example, a weighted sum of multiple polynomials associated with the same target object can be determined and used as a current representation of the estimated behavior of the target object. Based on the current representation of the estimated behavior of the target object, the system can determine whether a collision between the ego vehicle and the target object is probable or likely. If the probability of a collision exceeds a threshold or if a collision is otherwise probable or likely to occur, corrective action can occur. This may include controlling the ego vehicle's steering system to change a course or path of the ego vehicle's travel. This may also or alternatively include controlling the ego vehicle's motor(s) or braking system(s) to change the speed or acceleration of the ego vehicle.

Note that this type of process may occur for each of multiple target objects, such as for each target object detected around or near the ego vehicle. By using the covariance information and the multiple polynomials here, it is possible to deal with varying scenarios that may be experienced by the ego vehicle. This may include (i) situations where the target object has a generally steady motion relative to the ego vehicle and (ii) situations where the target object has a generally non-steady motion relative to the ego vehicle.

FIG. 1 illustrates an example system 100 supporting target behavior prediction according to this disclosure. In this particular example, the system 100 takes the form of an automotive vehicle, such as an electric vehicle. As a result, the system 100 may also be referred to as a vehicle 100. However, any other suitable system may support the use of target behavior prediction, such as other types of vehicles, autonomous robots, or other autonomous or non-autonomous systems.

As shown in FIG. 1, the vehicle 100 includes at least one processor 102 configured to control one or more operations of the vehicle 100. In this example, the processor 102 may interact with one or more perceptual or other sensors 104 and with one or more components coupled to a bus 106. In this particular example, the one or more sensors 104 include at least one camera, and the bus 106 represents a controller area network (CAN) bus. The at least one camera may represent any suitable imaging sensor(s), such as one or more visible, infrared, or other cameras. However, the processor 102 may interact with any other or additional sensor(s) and communicate over any other or additional bus(es). For instance, other or additional types of sensors 104 that may be used here can include one or more radio detection and ranging (RADAR) sensors, light detection and ranging (LIDAR) sensors, inertial measurement units (IMUs), or other types of sensors. In general, any suitable type(s) of sensor(s) 104 may be used to collect information for processing by the vehicle 100, and this disclosure is not limited to any specific type(s) of sensor(s) 104.

Measurements and/or other data from the sensors 104 are used by the processor 102 or other component(s) to perform target behavior prediction. In this example, the processor 102 performs a sensor fusion function 108, which generally operates to combine measurements from different sensors 104. For example, the sensor fusion function 108 may identify estimated locations or other information about objects detected using images or other data from multiple sensors 104, and the sensor fusion function 108 may combine measurements from different sensors 104 and/or information derived based on measurements from different sensors 104 for each detected object. The sensor fusion function 108 may combine information from different sensors 104 and/or information derived based on measurements from different sensors 104 in any suitable manner as needed or desired.

The combined sensor information is provided to a target path prediction function 110, which generally operates to estimate the behavior(s) of one or more detected target objects, such as one or more target objects around or near the vehicle 100. For example, the target path prediction function 110 can identify positions of a target object relative to the vehicle 100 over a period of time. These positions are used as tracking information, and the target path prediction function 110 can use the tracking information along with covariance information in order to generate a polynomial. The polynomial represents a curve that is fit to the tracking information in order to represent both actual prior locations of the target object and estimated future locations of the target object. The target path prediction function 110 can repeat this process over time as more positions of the target object relative to the vehicle 100 are received, which leads to the generation of multiple polynomials for the target object. The target path prediction function 110 can also perform this process for each of multiple target objects, such as to generate polynomials for multiple target objects around or near the vehicle 100. Example details of the operations of the target path prediction function 110 are provided below. In some embodiments, only sensor data from one or more perceptual sensors (such as cameras or other imaging devices) may be provided to the target path prediction function 110 for use.

The combined sensor information and the generated polynomials for each target object are provided to a collision prediction function 112, which generally operates to estimate whether a collision between the vehicle 100 and any target object is probable or likely. For example, the collision prediction function 112 may identify an estimated travel path of the vehicle 100, such as based on a current steering or travel direction of the vehicle 100. The collision prediction function 112 may also generate, for each target object, a weighted sum of the polynomials for that target object. The weighted sum of the polynomials for each target object can be used as a current representation of the estimated behavior of that target object. The collision prediction function 112 may further compare the estimated travel path of the vehicle 100 with the estimated path to be followed by each target object to see if the paths intersect or to see if the estimated path to be followed by each target object intersects the position of the vehicle 100. In some cases, the collision prediction function 112 can determine a probability of collision for each target object and compare each probability to a threshold in order to determine if a collision with that target object is probable or likely to occur. Example details of the operations of the collision prediction function 112 are provided below.

A decision planning function 114 generally uses various information, including an indication of whether a collision is or is not probable or likely to occur, to determine how to adjust the operation of the vehicle 100. For example, in an automotive vehicle, the decision planning function 114 may determine whether (and how) to change the steering or travel direction of the vehicle 100, whether (and how) to apply the brakes or accelerate the vehicle 100, or whether (and how) to trigger an audible, visible, haptic, or other warning. The warning may indicate that the vehicle 100 is near another vehicle, obstacle, or person, is departing from a current lane in which the vehicle 100 is traveling, or is approaching a possible impact location with another vehicle, obstacle, or person. In general, the identified adjustments determined by the decision planning function 114 can vary widely based on the specific application.

The decision planning function 114 can interact with a motion control function 116, which generally uses various information to determine how to actually adjust the operation of the vehicle 100 so that the vehicle 100 alters its path, speed, or other operational characteristic(s). For example, the motion control function 116 may determine one or more actions to be taken in order to avoid a collision with a target object. In order to actually implement changes to the operation of the vehicle 100, the motion control function 116 can be used to adjust or control the operation of one or more actuators 118 in the vehicle 100. In some cases, the one or more actuators 118 may represent one or more electric motors, brakes, regenerative braking systems, or other controls that can be used to adjust the speed or acceleration/deceleration of the vehicle 100. In other cases, the one or more actuators 118 may represent one or more steering controls, torque vectoring controls, or other controls that can be used to adjust the travel direction of the vehicle 100. A combination of these controls may also be used. Note, however, that the specific ways in which the operations of the vehicle 100 can vary depend on the specific vehicle 100 being used.

The functions 108-116 shown in FIG. 1 and described above may be implemented in any suitable manner in the vehicle 100. For example, in some embodiments, various functions 108-116 may be implemented or supported using one or more software applications or other software instructions that are executed by at least one processor 102. In other embodiments, at least some of the functions 108-116 can be implemented or supported using dedicated hardware components. In general, the functions 108-116 described above may be performed using any suitable hardware or any suitable combination of hardware and software/firmware instructions.

The processor 102 itself may also be implemented in any suitable manner, and the vehicle 100 may include any suitable number(s) and type(s) of processors or other processing devices in any suitable arrangement. Example types of processors 102 that may be used here include one or more microprocessors, microcontrollers, digital signal processors (DSPs), application specific integrated circuits (ASICs), field programmable gate arrays (FPGAs), or discrete circuitry. Each processor 102 may also have any suitable number of processing cores or engines. In some cases, multiple processors 102 or multiple processing cores or engines in one or more processors 102 may be used to perform the functions 108-116 described above. This may allow, for instance, the processor(s) 102 to be used to process information and perform common tasks or different tasks in parallel.

Although FIG. 1 illustrates one example of a system 100 supporting target behavior prediction, various changes may be made to FIG. 1. For example, various functions and components shown in FIG. 1 may be combined, further subdivided, replicated, omitted, or rearranged and additional functions and components may be added according to particular needs. Also, the predicted behavior of at least one target object may be used in any suitable manner for any suitable purpose in any suitable system.

Figure 2:
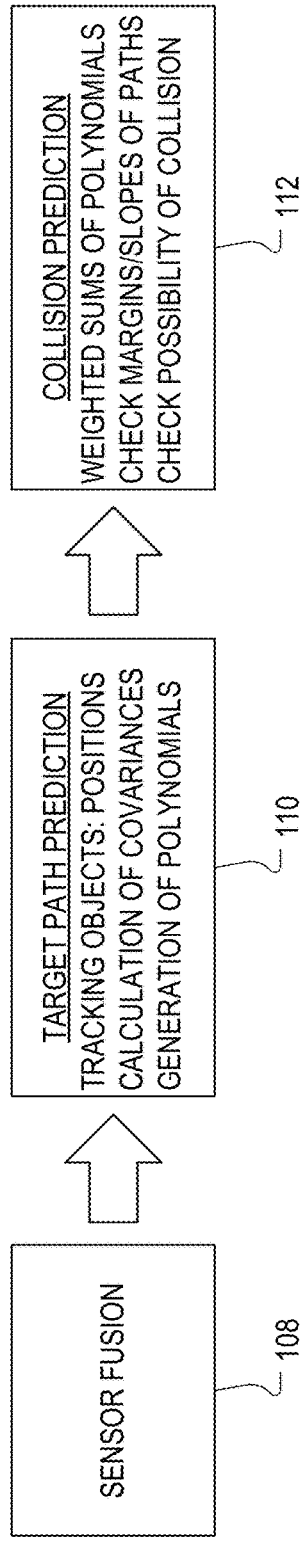
FIG. 2 illustrates example functions for target behavior prediction in the system of FIG. 1 according to this disclosure.

FIG. 2 illustrates example functions for target behavior prediction in the system 100 of FIG. 1 according to this disclosure. As shown in FIG. 2, the sensor fusion function 108 provides combined sensor information to the target path prediction function 110. The target path prediction function 110 here includes a tracking function, which generally involves the target path prediction function 110 tracking the positions of one or more target objects relative to the vehicle 100 over time. This function can involve identifying target objects in images or other sensor data and identifying relative distances from the vehicle 100 to the identified target objects. Each of the positions may be expressed in any suitable manner, such as a distance and an angle from the vehicle 100 or as coordinates in a vehicle coordinate frame. The target path prediction function 110 here also includes a covariances calculation function, which generally involves calculating the covariance of the identified positions for each target object. The covariances can be determined as described below and may be used to help indicate whether a target object has generally steady or generally non-steady relative motion, which can affect how a polynomial representing the movement of the target object is determined. In addition, the target path prediction function 110 here includes a polynomial generation function, which generally involves fitting a polynomial curve to the identified positions of each target object. The target path prediction function 110 may use any suitable curve-fitting technique or other approach to generate a polynomial based on identified relative positions of a target object.

The collision prediction function 112 here includes a weighted sum function, which generally involves the collision prediction function 112 determining a weighted sum of multiple polynomials for each target object. One example approach for determining a weighted sum of multiple polynomials is described below. The weighted sum for each target object represents a current estimate of the expected behavior of that target object. The collision prediction function 112 here also includes a margin/slope check function. This function generally involves the collision prediction function 112 checking the margin or spacing between the vehicle 100 and the estimated path of each target object, which may be based on the $a_0$ coefficient of the weighted sum as described below. This function also generally involves the collision prediction function 112 checking the speed (slope) of each target object approaching the vehicle 100, which may be based on the $a_2$ coefficient of the weighted sum as described below. The collision prediction function 112 here further includes a collision check function, which generally involves the collision prediction function 112 determining a probability or other likelihood of a collision between the vehicle 100 and each target object. This can be based on the identified margin/spacing and slope/speed related to each target object.

Although FIG. 2 illustrates examples of functions 110, 112 for target behavior prediction in the system 100 of FIG. 1, various changes may be made to FIG. 2. For example, the functions shown in FIG. 2 may be combined, further subdivided, replicated, omitted, or rearranged and additional functions may be added according to particular needs.

Figure 3:
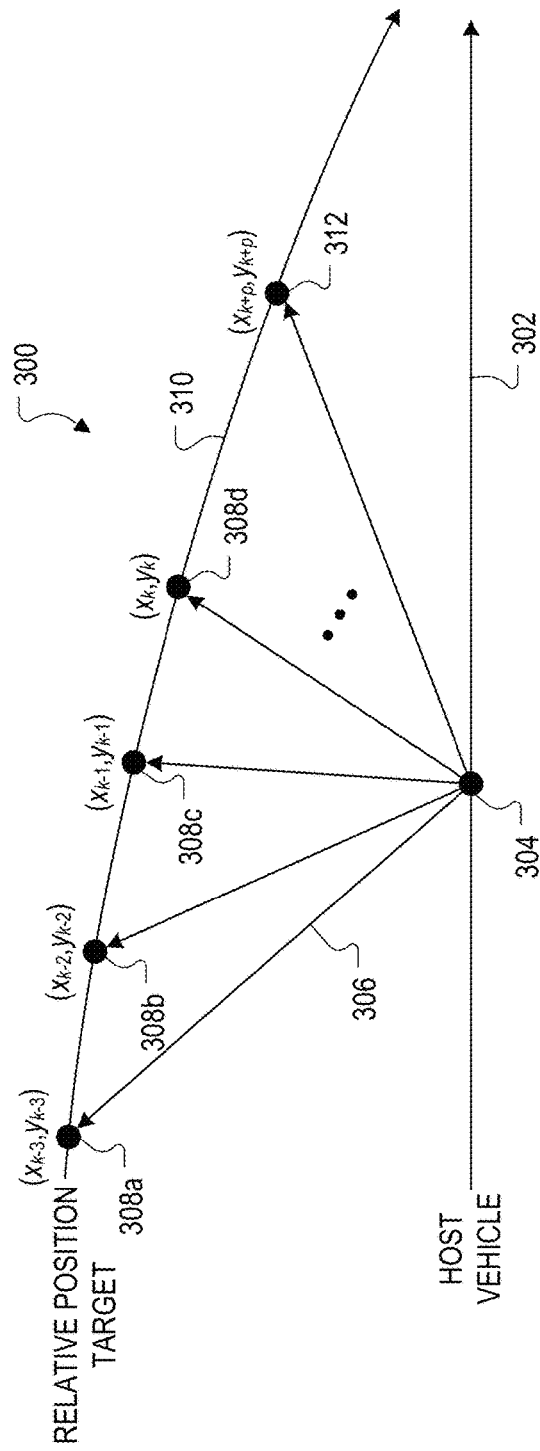

FIGS. 3 and 4 illustrate examples of performing target behavior prediction under steady and non-steady relative motions according to this disclosure. For ease of explanation, the target behavior prediction under steady and non-steady relative motions is described as being performed using the vehicle 100 of FIG. 1. However, target behavior prediction under steady or non-steady relative motion may be used in any other suitable vehicle or other system.

As shown in FIG. 3, a graph 300 plots a path 302 associated with a host vehicle (such as the vehicle 100) over time. In some cases, the path 302 may be based on the current steering or travel direction of the host vehicle. The graph 300 also includes a point 304 on the path 302 that identifies a current position of the host vehicle. Vectors 306 extend from the point 304 on the path 302 to multiple points 308a-308d associated with a target object. The vectors 306 define the relative positions of the target object with respect to the host vehicle over time. In this particular example, one vector 306 defines a point 308d identifying the relative position of the target object with respect to the host vehicle during a current time interval (which is denoted k). Other vectors 306 define points 308a-308c identifying the relative positions of the target object with respect to the host vehicle during three previous time intervals (which are denoted k−3, k−2, and k−1).

As can be seen in the example of FIG. 3, the target object has generally non-steady motion relative to the host vehicle. That is, the direction to or the distance between the target object and the host vehicle varies significantly, which can indicate that the target object is moving closer to or farther from the host vehicle over time. In these or other situations, the points 308a-308d are relatively spaced apart, and it is therefore possible for the target path prediction function 110 to generate a polynomial that represents the actual and estimated behaviors of the target object. In some embodiments, the target path prediction function 110 may operate as follows. The set of points 308a-308d can be represented as $(x_i, y_i)$, where i=k−3, k−2, k−1, k. Thus, the points $(x_i, y_i)$ can represent the current relative position of the target object and one or more past relative positions of the target object. In this particular example, a third-order polynomial can be generated to represent these points $(x_i, y_i)$. In some cases, the third-order polynomial may be expressed as follows.

$$y_{t,raw}(x) = \sum_{j=0}^{3} a_{raw,j} \cdot x^j$$

Here, x represents forward distance (such as in meters) from the host vehicle's coordinate system, and $\{a_{raw,j}\}$ represents a set of coefficients for the polynomial based on the points from the current time interval k to the previous time intervals to k−3. Using this polynomial, it is possible to define an estimated path 310 for the target object and to predict a future position of the target object as represented by a point 312 for a future time interval k+p. Note that while a third-order polynomial is generated here, polynomials of other orders may be generated using other numbers of points associated with relative positions of a target object.

In contrast, as shown in FIG. 4, a graph 400 plots another path 402 associated with a host vehicle (such as the vehicle 100) over time, and a point 404 on the path 402 identifies a current position of the host vehicle. Vectors 406 extend from the point 404 on the path 402 to multiple points 408a-408d associated with a target object. The vectors 406 define the relative positions of the target object with respect to the host vehicle over time. More specifically, one vector 406 defines a point 408d identifying the relative position of the target object with respect to the host vehicle during a current time interval. Other vectors 406 define points 408a-408c identifying the relative positions of the target object with respect to the host vehicle during three previous time intervals.

As can be seen in the example of FIG. 4, the target object has generally steady motion relative to the host vehicle. That is, the direction to and the distance between the target object and the host vehicle remain relatively constant, which can indicate that the target object is generally remaining at or near the same distance from the host vehicle over time. In these or other situations, the points 406a-406d are relatively close together, and it may be difficult to generate a polynomial that accurately estimates the behavior of the target object. For instance, while it may be possible to generate a polynomial that defines an estimated path 410 for the target object and to predict a future position of the target object as represented by a point 412 along the estimated path 410, another polynomial might define another (but equally valid based on the points 406a-406d) estimated path 414 and to predict a different future position of the target object relative to the host vehicle.

To allow the vehicle 100 to deal with both steady relative target motion and non-steady relative target motion, the target path prediction function 110 can generate covariance information for the relative positions identified by the points 308a-308d, 408a-408d. For example, in some embodiments, the target path prediction function 110 may generate a covariance matrix and determine a magnitude of the covariance based on the position vectors 306, 406. In some cases (like the examples shown in FIGS. 3 and 4), the covariance matrix and the magnitude of the covariance can be determined using four relative position vectors from $(x_k, y_k)$ to $(x_{k-3}, y_{k-3})$ in the following manner.

$$\Sigma = \begin{bmatrix} \sigma_{xx} & \sigma_{xy} \\ \sigma_{yx} & \sigma_{yy} \end{bmatrix}, \delta = \sqrt{\sigma_{xx}^2 + \sigma_{yy}^2}$$

Here, $\Sigma$ represents the covariance matrix, and $\sigma$_represents the variance or covariance between the x elements and/or the y elements in the relative position vectors. Also, $\delta$ represents the magnitude of the covariance between the relative position vectors.

In some embodiments, a polynomial $y_t(x)$ representing a target object's estimated positions relative to the host vehicle can be generated regardless of the steady or non-steady nature of the relative target motion by using the covariance information of the tracked points. For example, in particular embodiments, an activation function may be provided for generating a polynomial $y_{t,raw}(x)$ with a covariance activation threshold $\delta_{thrsh}$. Here, a set of coefficients $\{a_{raw,j}\}$ can be calculated for a polynomial (such as by using the first equation above) only when the activation is on, which means that the magnitude of the calculated covariance $\delta$ is at or above the covariance activation threshold $\delta_{thrsh}$. When the calculated covariance $\delta$ is below the covariance activation threshold $\delta_{thrsh}$, the set of coefficients $\{a_{raw,j}\}$ for the polynomial $y_{t,raw}(x)$ can be a set of zeros.

The collision prediction function 112 can generate a weighted sum of multiple polynomials for each target object as part of the process of performing collision prediction. That is, the collision prediction function 112 can apply different weights to polynomials generated for the same target object over time, where different polynomials can be weighted differently. In some embodiments, the collision prediction function 112 can sum the polynomials generated for the same target object over a period of two to three seconds (although other time periods may be used). As a particular example, the accumulated set of coefficients for a weighted sum of multiple polynomials at a current time interval k may be expressed as follows.

$$\{a_j\}_k = \sum_{i=0}^{-n} w_i \cdot \{a_{raw,j}\}_i$$

Here, $\{a_j\}_k$ represents the set of coefficients for a final polynomial that represents a weighted sum of multiple polynomials for a target object. Also, $w_i$ represents a weight applied to the coefficients of the $i^{th}$ polynomial, and n represents the number of previous time intervals for which polynomials are combined in the weighted sum. In some cases, it can be determined as follows.

$$n = \frac{k_p}{\Delta t}$$

Here, it is defined as the number of sampled data points for $k_p$ seconds, and $\Delta t$ is a sampling rate in seconds.

In some embodiments, the weights $w_i$ used here can be based on the calculated magnitude of the covariance $\delta$. In particular embodiments, the weights $w_i$ may be defined using a sigmoid function. In these cases, the weights $w_i$ may be expressed as follows.

$$w_i = \frac{1}{1 + e^{-a_p(i - b_p)}}$$

Here, $a_p$ and $b_p$ may represent tuning parameters used to define the sigmoid weight function, where $a_p > 0$ and $b_p < 0$. In some instances, these tuning parameters may be used to center the weight function at or near the middle of previously-sampled position points defining the relative positions of the target object.

FIGS. 5A and 5B illustrate example approaches for polynomial generation and weighted summing for use during target behavior prediction according to this disclosure. In FIG. 5A, a graph 500 plots how the magnitude of the covariance $\delta$ of position points translates into generation of polynomial coefficients. As shown here, as long as the calculated magnitude of the covariance $\delta$ of the position points remains below a point 502 defined by the covariance activation threshold $\delta_{thrsh}$, the generation of polynomial coefficients remains off, and any polynomial that is generated here has zeros for its coefficients. The weighted average discussed above combines those zero coefficients with coefficients for other polynomials to generate the final polynomial representing a current estimate of the target object's behavior.

When the calculated magnitude of the covariance $\delta$ of the position points rises above the point 502 defined by the covariance activation threshold $\delta_{thrsh}$, the generation of polynomial coefficients is activated, and any polynomial that is generated here can be produced using the first equation shown above (and would typically include one or more non-zero coefficients). The weighted average discussed above combines those coefficients with coefficients for other polynomials to generate the final polynomial representing a current estimate of the target object's behavior.

In FIG. 5B, a graph 520 plots the weight values $w_i$ that may be applied to polynomial coefficients when generating a weighted combination. In this example, the weight values have the form of a sigmoid function, where newer polynomial coefficients are weighted more heavily than older polynomial coefficients and where the weights rapid change in a middle portion of the function.

Once a final polynomial for a target object is generated using a weighted combination of the multiple polynomials for that target object, the collision prediction function 112 can estimate whether collision between the vehicle 100 and the target object is likely or probable. For example, in some cases, the collision prediction function 112 may use the coefficients $a_0$ and $a_2$ of the final polynomial to identify the likelihood of collision. The $a_0$ coefficient generally corresponds to a lateral displacement between the vehicle 100 and the target object, and the $a_2$ coefficient generally corresponds to the curvature of the target object's path (which may be generally straight or towards or away from the travel direction of the vehicle 100). By monitoring these coefficients, the collision prediction function 112 can detect when collisions with target objects may occur.

Figure 6A:
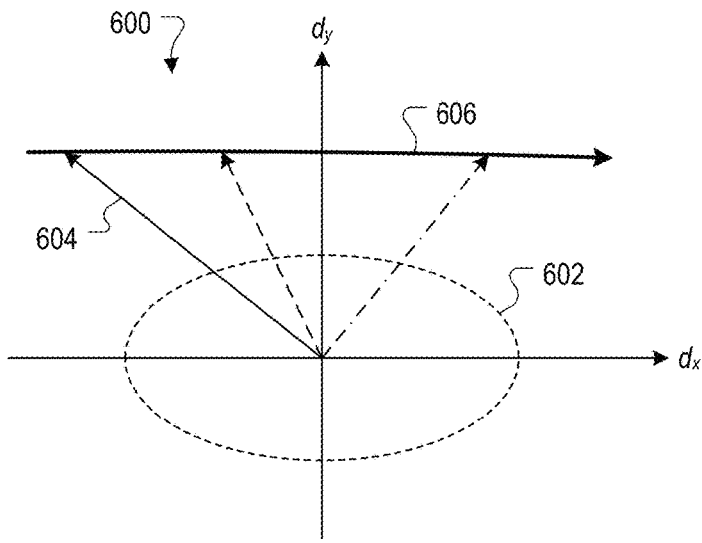
FIGS. 6A through 6C illustrate example results obtained when performing target behavior prediction in different vehicular scenarios according to this disclosure.
Figure 6B:
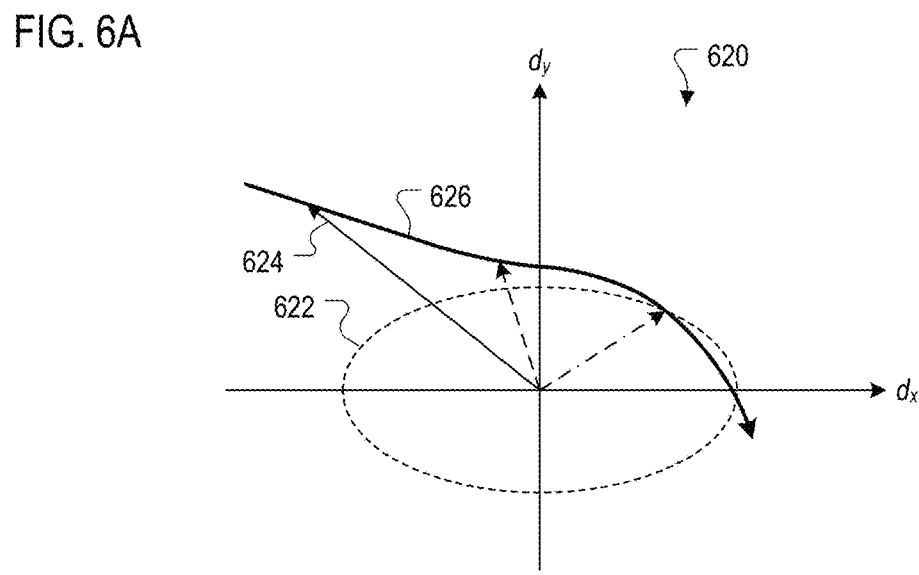
Figure 6C:
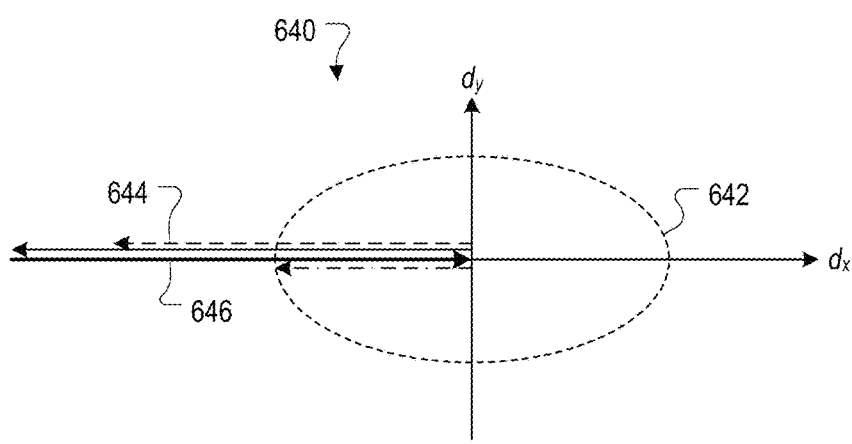

FIGS. 6A through 6C illustrate example results obtained when performing target behavior prediction in different vehicular scenarios according to this disclosure. In FIG. 6A, it is assumed that a target object is passing the vehicle 100 and is traveling generally parallel to the traveling direction of the vehicle 100. Thus, in FIG. 6A, a graph 600 uses an outline 602 to represent the vehicle 100, and various vectors 604 are used to define an estimated travel path 606 of the target object, which represents a weighted combination of multiple polynomial curves for the target object. As can be seen here, the estimated travel path 606 does not intersect the outline 602, thereby indicating that the probability of collision is currently low.

In FIG. 6B, it is assumed that a target object is overtaking the vehicle 100 from the side. Thus, in FIG. 6B, a graph 620 uses an outline 622 to represent the vehicle 100, and various vectors 624 are used to define an estimated travel path 626 of the target object, which represents a weighted combination of multiple polynomial curves for the target object. As can be seen here, the estimated travel path 626 intersects the outline 622, thereby indicating that the probability of collision is currently high. Given that, one or more corrective actions can be taken, such as triggering an audible, visible, haptic, or other warning; speeding up or slowing down the vehicle 100; or changing a traveling direction of the vehicle 100.

Similarly, in FIG. 6C, it is assumed that a target object is overtaking the vehicle 100 from the rear. Thus, in FIG. 6C, a graph 640 uses an outline 642 to represent the vehicle 100, and various vectors 644 are used to define an estimated travel path 646 of the target object, which represents a weighted combination of multiple polynomial curves for the target object. Here, the vectors 644 are shown as extending from locations other than the origin defined by the two axes in the graph 640, although this is for ease of illustration only (all of the vectors 644 in FIG. 6C would typically extend from the origin defined by the two axes). As can be seen here, the estimated travel path 646 intersects the outline 642, thereby indicating that the probability of collision is currently high. Given that, one or more corrective actions can again be taken, such as triggering an audible, visible, haptic, or other warning; speeding up or slowing down the vehicle 100; or changing a traveling direction of the vehicle 100.

In this way, the target path prediction function 110 and the collision prediction function 112 provide a mechanism for identifying estimated behaviors of one or more target objects over time and determining whether the estimated behaviors may result in collisions with the vehicle 100. This can occur regardless of whether a target object has generally steady or generally non-steady relative motion with respect to the vehicle 100.

Although FIGS. 3 and 4 illustrate examples of performing target behavior prediction under steady and non-steady relative motions, various changes may be made to FIGS. 3 and 4. For example, the steady and non-steady relative motions shown in FIGS. 3 and 4 are examples only and can easily vary depending on the circumstances. Although FIGS. 5A and 5B illustrate examples of approaches for polynomial generation and weighted summing for use during target behavior prediction, various changes may be made to FIGS. 5A and 5B. For instance, the covariance activation threshold $\delta_{thrsh}$ may be set to any suitable value and may be dynamic in some implementations, and any suitable weighting function may be used and may be dynamic in some implementations. Although FIGS. 6A through 6C illustrate examples of results obtained when performing target behavior prediction in different vehicular scenarios, various changes may be made to FIGS. 6A through 6C. For example, the vehicular scenarios shown in FIGS. 6A through 6C are examples only, and various other scenarios can exist in which target behavior prediction may be used.

Figure 7:
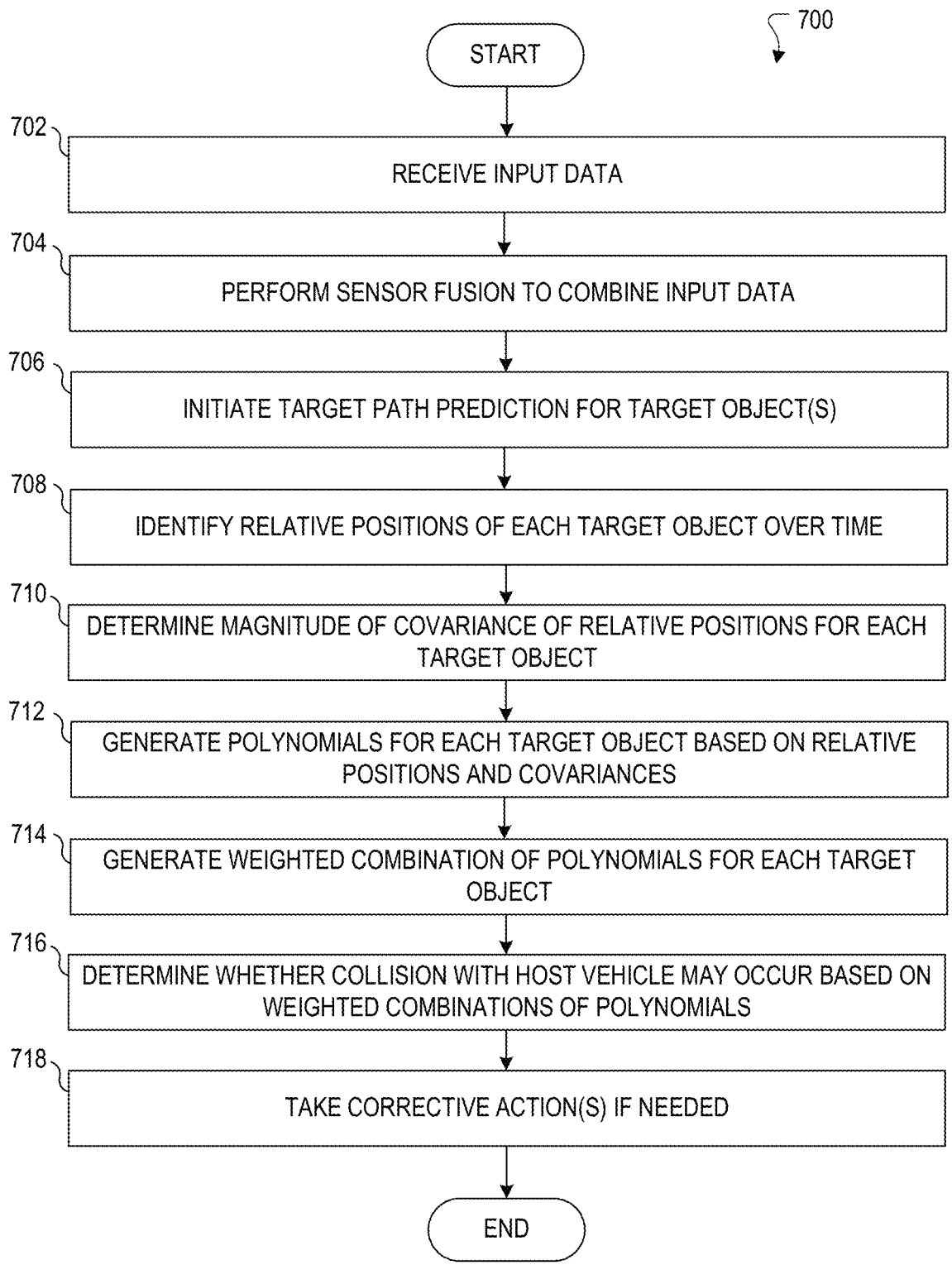
FIG. 7 illustrates an example method for target behavior prediction according to this disclosure.

FIG. 7 illustrates an example method 700 for target behavior prediction according to this disclosure. For ease of explanation, the method 700 is described as being performed using the vehicle 100 of FIG. 1. However, the method 700 may be performed using any other suitable vehicle or other system.

As shown in FIG. 7, input data is received at step 702. This may include, for example, the processor 102 of a host vehicle 100 obtaining images or other sensor data from one or more sensors 104 of the vehicle 100. Sensor fusion may optionally be performed to combine the input data at step 704. This may include, for example, the processor 102 of the vehicle 100 performing the sensor fusion function 108 to identify vehicles, obstacles, or people in images or other sensor data. This may also include the processor 102 of the vehicle 100 performing the sensor fusion function 108 to aggregate the sensor data for each detected object from multiple sensors 104.

Target path prediction for one or more target objects is initiated at step 706. This may include, for example, the processor 102 of the vehicle 100 providing sensor data for one or more target objects to the target path prediction function 110. The one or more target objects may be identified in any suitable manner, such as by identifying the one or more detected objects that are closest to or within a specified distance of the vehicle 100. Relative positions of each target object with respect to the host vehicle are determined over time at step 708. This may include, for example, the processor 102 of the vehicle 100 performing the target path prediction function 110 to identify a position vector, coordinates, or other location information that defines the location of each target object relative to the vehicle 100 during different time intervals. A magnitude of a covariance of the relative positions for each target object is determined a step 710. This may include, for example, the processor 102 of the vehicle 100 performing the target path prediction function 110 to identify a covariance matrix $\Sigma$ and a magnitude of the covariance $\delta$ between the relative positions of each target object.

Polynomials for each target object are generated based on the relative positions and the identified covariances at step 712. This may include, for example, the processor 102 of the vehicle 100 performing the target path prediction function 110 to generate a polynomial having zeros as coefficients for each target object having a magnitude of covariance $\delta$ below a covariance activation threshold $\delta_{thrsh}$. This may also include the processor 102 of the vehicle 100 performing the target path prediction function 110 to generate a polynomial having calculated coefficients for each target object having a magnitude of covariance $\delta$ at or above a covariance activation threshold $\delta_{thrsh}$. A polynomial for each target object can be generated during each of multiple time intervals. A weighted combination of the polynomials for each target object is generated at step 714. This may include, for example, the processor 102 of the vehicle 100 performing the collision prediction function 112 to identify weights $w_i$ for different polynomials of each target object and applying those weights $w_i$ to the coefficients of those polynomials for each target object.

A determination is made whether any collisions with the host vehicle might occur based on the weighted combinations of polynomials at step 716. This may include, for example, the processor 102 of the vehicle 100 performing the collision prediction function 112 to identify whether the $a_0$ coefficient in any weighted combination of polynomials indicates that a lateral displacement between the vehicle 100 and a target object is falling below a threshold distance. This may also or alternatively include the processor 102 of the vehicle 100 performing the collision prediction function 112 to identify whether the $a_2$ coefficient in any weighted combination of polynomials indicates that a curvature of a target object's path is towards the travel direction of the vehicle 100. If a collision is possible/probable/likely, one or more corrective actions may occur at step 718. This may include, for example, the processor 102 of the vehicle 100 using the decision planning function 114 and motion control function 116 to initiate a change to a speed or acceleration/deceleration of the vehicle 202 and/or to initiate emergency braking, evasion steering, collision warning, or other action(s).

Although FIG. 7 illustrates one example of a method 700 for target behavior prediction, various changes may be made to FIG. 7. For example, while shown as a series of steps, various steps in FIG. 7 may overlap, occur in parallel, occur in a different order, or occur any number of times. As a particular example, various target objects may be identified over time, different polynomials for each target object may be generated over time, and different weighted combinations of polynomials for each target object may be generated over time and used for collision detection. Thus, it is possible for some or all steps of the method 700 to occur in an overlapping or parallel manner to support continuous behavior prediction and collision monitoring.

Note that many functional aspects of the embodiments described above can be implemented using any suitable hardware or any suitable combination of hardware and software/firmware instructions. In some embodiments, at least some functional aspects of the embodiments described above can be embodied as software instructions that are executed by one or more unitary or multi-core central processing units or other processing device(s). In other embodiments, at least some functional aspects of the embodiments described above can be embodied using one or more application specific integrated circuits (ASICs). When implemented using one or more ASICs, any suitable integrated circuit design and manufacturing techniques may be used, such as those that can be automated using electronic design automation (EDA) tools. Examples of such tools include tools provided by SYNOPSYS, INC., CADENCE DESIGN SYSTEMS, INC., and SIEMENS EDA.

Figure 8:
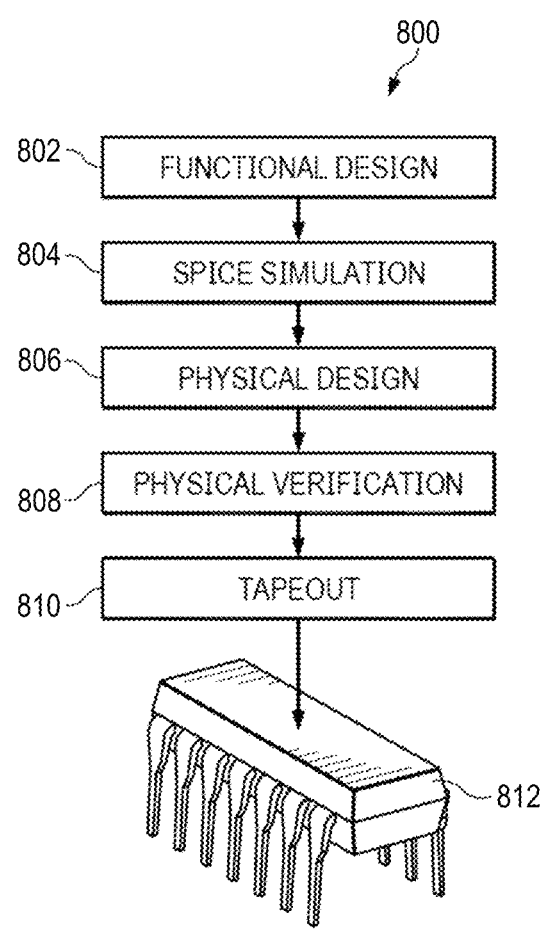
FIG. 8 illustrates an example design flow for employing one or more tools to design hardware that implements one or more functions according to this disclosure.

FIG. 8 illustrates an example design flow 800 for employing one or more tools to design hardware that implements one or more functions according to this disclosure. More specifically, the design flow 800 here represents a simplified ASIC design flow employing one or more EDA tools or other tools for designing and facilitating fabrication of ASICs that implement at least some functional aspects of the various embodiments described above.

As shown in FIG. 8, a functional design of an ASIC is created at step 802. For any portion of the ASIC design that is digital in nature, in some cases, this may include expressing the digital functional design by generating register transfer level (RTL) code in a hardware descriptive language (HDL), such as VHDL or VERILOG. A functional verification (such as a behavioral simulation) can be performed on HDL data structures to ensure that the RTL code that has been generated is in accordance with logic specifications. In other cases, a schematic of digital logic can be captured and used, such as through the use of a schematic capture program. For any portion of the ASIC design that is analog in nature, this may include expressing the analog functional design by generating a schematic, such as through the use of a schematic capture program. The output of the schematic capture program can be converted (synthesized), such as into gate/transistor level netlist data structures. Data structures or other aspects of the functional design are simulated, such as by using a simulation program with integrated circuits emphasis (SPICE), at step 804. This may include, for example, using the SPICE simulations or other simulations to verify that the functional design of the ASIC performs as expected.

A physical design of the ASIC is created based on the validated data structures and other aspects of the functional design at step 806. This may include, for example, instantiating the validated data structures with their geometric representations. In some embodiments, creating a physical layout includes "floor-planning," where gross regions of an integrated circuit chip are assigned and input/output (I/O) pins are defined. Also, hard cores (such as arrays, analog blocks, inductors, etc.) can be placed within the gross regions based on design constraints (such as trace lengths, timing, etc.). Clock wiring, which is commonly referred to or implemented as clock trees, can be placed within the integrated circuit chip, and connections between gates/analog blocks can be routed within the integrated circuit chip. When all elements have been placed, a global and detailed routing can be performed to connect all of the elements together. Post-wiring optimization may be performed to improve performance (such as timing closure), noise (such as signal integrity), and yield. The physical layout can also be modified where possible while maintaining compliance with design rules that are set by a captive, external, or other semiconductor manufacturing foundry of choice, which can make the ASIC more efficient to produce in bulk. Example modifications may include adding extra vias or dummy metal/diffusion/poly layers.

The physical design is verified at step 808. This may include, for example, performing design rule checking (DRC) to determine whether the physical layout of the ASIC satisfies a series of recommended parameters, such as design rules of the foundry. In some cases, the design rules represent a series of parameters provided by the foundry that are specific to a particular semiconductor manufacturing process. As particular examples, the design rules may specify certain geometric and connectivity restrictions to ensure sufficient margins to account for variability in semiconductor manufacturing processes or to ensure that the ASICs work correctly. Also, in some cases, a layout versus schematic (LVS) check can be performed to verify that the physical layout corresponds to the original schematic or circuit diagram of the design. In addition, a complete simulation may be performed to ensure that the physical layout phase is properly done.

After the physical layout is verified, mask generation design data is generated at step 810. This may include, for example, generating mask generation design data for use in creating photomasks to be used during ASIC fabrication. The mask generation design data may have any suitable form, such as GDSII data structures. This step may be said to represent a "tape-out" for preparation of the photomasks. The GDSII data structures or other mask generation design data can be transferred through a communications medium (such as via a storage device or over a network) from a circuit designer or other party to a photomask supplier/maker or to the semiconductor foundry itself. The photomasks can be created and used to fabricate ASIC devices at step 812.

Although FIG. 8 illustrates one example of a design flow 800 for employing one or more tools to design hardware that implements one or more functions, various changes may be made to FIG. 8. For example, at least some functional aspects of the various embodiments described above may be implemented in any other suitable manner.

Figure 9:
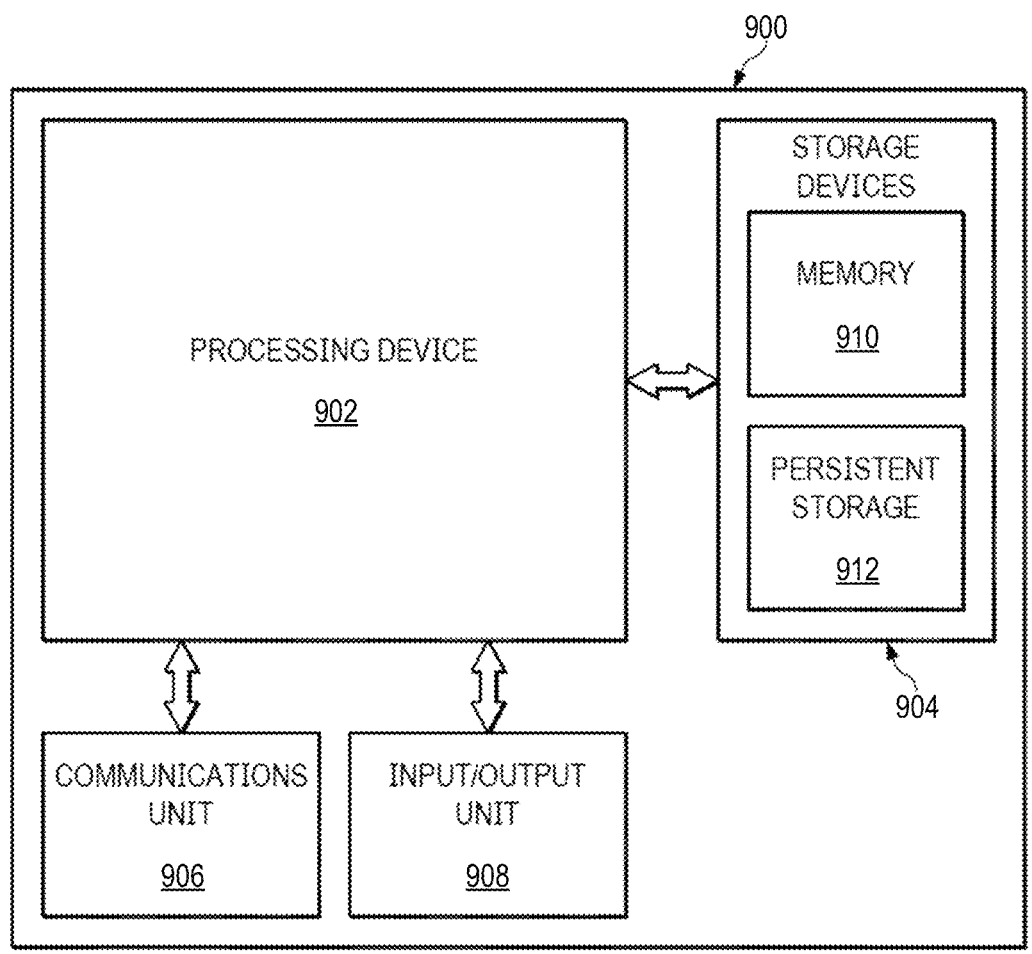
FIG. 9 illustrates an example device supporting execution of one or more tools to design hardware that implements one or more functions according to this disclosure.

FIG. 9 illustrates an example device 900 supporting execution of one or more tools to design hardware that implements one or more functions according to this disclosure. The device 900 may, for example, be used to implement at least part of the design flow 800 shown in FIG. 8. However, the design flow 800 may be implemented in any other suitable manner.

As shown in FIG. 9, the device 900 denotes a computing device or system that includes at least one processing device 902, at least one storage device 904, at least one communications unit 906, and at least one input/output (I/O) unit 908. The processing device 902 may execute instructions that can be loaded into a memory 910. The processing device 902 includes any suitable number(s) and type(s) of processors or other processing devices in any suitable arrangement. Example types of processing devices 902 include one or more microprocessors, microcontrollers, DSPs, ASICs, FPGAs, or discrete circuitry.

The memory 910 and a persistent storage 912 are examples of storage devices 904, which represent any structure(s) capable of storing and facilitating retrieval of information (such as data, program code, and/or other suitable information on a temporary or permanent basis). The memory 910 may represent a random access memory or any other suitable volatile or non-volatile storage device(s). The persistent storage 912 may contain one or more components or devices supporting longer-term storage of data, such as a read only memory, hard drive, Flash memory, or optical disc.

The communications unit 906 supports communications with other systems or devices. For example, the communications unit 906 can include a network interface card or a wireless transceiver facilitating communications over a wired or wireless network. The communications unit 906 may support communications through any suitable physical or wireless communication link(s).

The I/O unit 908 allows for input and output of data. For example, the I/O unit 908 may provide a connection for user input through a keyboard, mouse, keypad, touchscreen, or other suitable input device. The I/O unit 908 may also send output to a display or other suitable output device. Note, however, that the I/O unit 908 may be omitted if the device 900 does not require local I/O, such as when the device 900 represents a server or other device that can be accessed remotely.

The instructions that are executed by the processing device 902 include instructions that implement at least part of the design flow 800. For example, the instructions that are executed by the processing device 902 may cause the processing device 902 to generate or otherwise obtain functional designs, perform simulations, generate physical designs, verify physical designs, perform tape-outs, or create/use photomasks (or any combination of these functions). As a result, the instructions that are executed by the processing device 902 support the design and fabrication of ASIC devices or other devices that implement one or more functions described above.

Although FIG. 9 illustrates one example of a device 900 supporting execution of one or more tools to design hardware that implements one or more functions, various changes may be made to FIG. 9. For example, computing and communication devices and systems come in a wide variety of configurations, and FIG. 9 does not limit this disclosure to any particular computing or communication device or system.

In some embodiments, various functions described in this patent document are implemented or supported using machine-readable instructions that are stored on a non-transitory machine-readable medium. The phrase "machine-readable instructions" includes any type of instructions, including source code, object code, and executable code. The phrase "non-transitory machine-readable medium" includes any type of medium capable of being accessed by one or more processing devices or other devices, such as a read only memory (ROM), a random access memory (RAM), a Flash memory, a hard disk drive (HDD), or any other type of memory. A "non-transitory" medium excludes wired, wireless, optical, or other communication links that transport transitory electrical or other signals. Non-transitory media include media where data can be permanently stored and media where data can be stored and later overwritten.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 114(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 114(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   obtaining sensor data associated with a target object at a host vehicle;
   identifying relative positions of the target object with reference to the host vehicle over time;
   generating polynomials associated with the target object over time based on the relative positions of the target object, wherein coefficients of each polynomial are based on a magnitude of a covariance of the relative positions of the target object used to generate the polynomial;
   comparing, for at least one polynomial of the polynomials being generated, the magnitude of the covariance to a covariance activation threshold in order to determine whether the coefficients of the at least one polynomial are determined or set to zero;

generating a weighted combination of the polynomials for the target object, wherein the weighted combination is a representation of an estimated behavior of the target object;

determining whether a collision between the host vehicle and the target object is possible based on the weighted combination of the polynomials; and in response to determining that the collision between the host vehicle and the target object is possible, initiating one or more corrective actions by the host vehicle.

2. The method of claim 1, further comprising, for each polynomial being generated:

generating a covariance matrix based on the relative positions of the target object used to generate the polynomial;

generating the magnitude of the covariance of the relative positions of the target object used to generate the polynomial based on the covariance matrix; and comparing the magnitude of the covariance to the covariance activation threshold in order to determine whether the coefficients of the polynomial are determined or set to zero.

3. The method of claim 2, wherein:

the coefficients of the polynomial are set to zero when the magnitude of the covariance is below the covariance activation threshold; and the coefficients of the polynomial are determined using the relative positions of the target object when the magnitude of the covariance is above the covariance activation threshold.

4. The method of claim 1, wherein generating the weighted combination of the polynomials for the target object comprises using weights defined by a sigmoid function.

5. The method of claim 1, wherein determining whether the collision between the host vehicle and the target object is possible comprises:

determining whether one coefficient of the weighted combination of the polynomials related to a lateral displacement between the host vehicle and the target object indicates that collision is possible; and determining whether another coefficient of the weighted combination of the polynomials related to a curvature of an estimated path of the target object is towards a travel direction of the host vehicle and indicates that collision is possible.

6. The method of claim 1, wherein the one or more corrective actions comprise at least one of:

adjusting at least one of: a steering of the host vehicle, a speed of the host vehicle, and a braking of the host vehicle; and activating an audible, visible, or haptic warning.

7. The method of claim 1, further comprising repeatedly:

generating the polynomials for the target object and the weighted combination of the polynomials for the target object over time; and determining whether the collision between the host vehicle and the target object is possible based on the weighted combination of the polynomials for the target object.

8. The method of claim 1, further comprising repeatedly:

generating multiple polynomials for multiple target objects and weighted combinations of the multiple polynomials for the multiple target objects over time; and determining whether a collision between the host vehicle and any of the target objects is possible based on the weighted combination of the polynomials for the multiple target objects.

9. An apparatus comprising:

at least one processing device configured to:

obtain sensor data associated with a target object at a host vehicle;

identify relative positions of the target object with reference to the host vehicle over time;

generate polynomials associated with the target object over time based on the relative positions of the target object, wherein coefficients of each polynomial are based on a magnitude of a covariance of the relative positions of the target object used to generate the polynomial;

compare, for at least one polynomial of the polynomials being generated, the magnitude of the covariance to a covariance activation threshold in order to determine whether the coefficients of the at least one polynomial are determined or set to zero;

generate a weighted combination of the polynomials for the target object, wherein the weighted combination is a representation of an estimated behavior of the target object;

determine whether a collision between the host vehicle and the target object is possible based on the weighted combination of the polynomials; and in response to determining that the collision between the host vehicle and the target object is possible, initiate one or more corrective actions by the host vehicle.

10. The apparatus of claim 9, wherein the at least one processing device is further configured, for each polynomial being generated, to:

generate a covariance matrix based on the relative positions of the target object used to generate the polynomial;

generate the magnitude of the covariance of the relative positions of the target object used to generate the polynomial based on the covariance matrix; and compare the magnitude of the covariance to the covariance activation threshold in order to determine whether the coefficients of the polynomial are determined or set to zero.

11. The apparatus of claim 10, wherein:

the at least one processing device is configured to set the coefficients of the polynomial to zero when the magnitude of the covariance is below the covariance activation threshold; and the at least one processing device is configured to determine the coefficients of the polynomial using the relative positions of the target object when the magnitude of the covariance is above the covariance activation threshold.

12. The apparatus of claim 9, wherein, to generate the weighted combination of the polynomials for the target object, the at least one processing device is configured to use weights defined by a sigmoid function.

13. The apparatus of claim 9, wherein, to determine whether the collision between the host vehicle and the target object is possible, the at least one processing device is configured to:
  determine whether one coefficient of the weighted combination of the polynomials related to a lateral displacement between the host vehicle and the target object indicates that collision is possible; and
  determine whether another coefficient of the weighted combination of the polynomials related to a curvature of an estimated path of the target object is towards a travel direction of the host vehicle and indicates that collision is possible.

14. The apparatus of claim 9, wherein the one or more corrective actions comprise at least one of:
  adjusting at least one of: a steering of the host vehicle, a speed of the host vehicle, and a braking of the host vehicle; and
  activating an audible, visible, or haptic warning.

15. The apparatus of claim 9, wherein the at least one processing device is further configured to repeatedly:
  generate the polynomials for the target object and the weighted combination of the polynomials for the target object over time; and
  determine whether the collision between the host vehicle and the target object is possible based on the weighted combination of the polynomials for the target object.

16. The apparatus of claim 9, wherein the at least one processing device is further configured to repeatedly:
  generate multiple polynomials for multiple target objects and weighted combinations of the multiple polynomials for the multiple target objects over time; and
  determine whether a collision between the host vehicle and any of the target objects is possible based on the weighted combination of the polynomials for the multiple target objects.

17. A non-transitory machine-readable medium containing instructions that when executed cause at least one processing device of a host vehicle to:
  obtain sensor data associated with a target object;
  identify relative positions of the target object with reference to the host vehicle over time;
  generate polynomials associated with the target object over time based on the relative positions of the target object, wherein coefficients of each polynomial are based on a magnitude of a covariance of the relative positions of the target object used to generate the polynomial;
  compare, for at least one polynomial of the polynomials being generated, the magnitude of the covariance to a covariance activation threshold in order to determine whether the coefficients of the at least one polynomial are determined or set to zero;
  generate a weighted combination of the polynomials for the target object, wherein the weighted combination is a representation of an estimated behavior of the target object;
  determine whether a collision between the host vehicle and the target object is possible based on the weighted combination of the polynomials; and
  in response to determining that the collision between the host vehicle and the target object is possible, initiate one or more corrective actions by the host vehicle.

18. The non-transitory machine-readable medium of claim 17, further containing instructions that when executed cause the at least one processing device, for each polynomial being generated, to:
  generate a covariance matrix based on the relative positions of the target object used to generate the polynomial;
  generate the magnitude of the covariance of the relative positions of the target object used to generate the polynomial based on the covariance matrix; and
  compare the magnitude of the covariance to the covariance activation threshold in order to determine whether the coefficients of the polynomial are determined or set to zero.

19. The non-transitory machine-readable medium of claim 18, wherein:
  the instructions when executed cause the at least one processing device to set the coefficients of the polynomial to zero when the magnitude of the covariance is below the covariance activation threshold; and
  the instructions when executed cause the at least one processing device to determine the coefficients of the polynomial using the relative positions of the target object when the magnitude of the covariance is above the covariance activation threshold.

20. The non-transitory machine-readable medium of claim 17, wherein the instructions that when executed cause the at least one processing device to generate the weighted combination of the polynomials for the target object comprise:
  instructions that when executed cause the at least one processing device to use weights defined by a sigmoid function.

21. The non-transitory machine-readable medium of claim 17, wherein the instructions that when executed cause the at least one processing device to determine whether the collision between the host vehicle and the target object is possible comprise:
  instructions that when executed cause the at least one processing device to:
    determine whether one coefficient of the weighted combination of the polynomials related to a lateral displacement between the host vehicle and the target object indicates that collision is possible; and
    determine whether another coefficient of the weighted combination of the polynomials related to a curvature of an estimated path of the target object is towards a travel direction of the host vehicle and indicates that collision is possible.

22. The non-transitory machine-readable medium of claim 17, wherein the one or more corrective actions comprise at least one of:
  adjusting at least one of: a steering of the host vehicle, a speed of the host vehicle, and a braking of the host vehicle; and
  activating an audible, visible, or haptic warning.

23. The non-transitory machine-readable medium of claim 17, further containing instructions that when executed cause the at least one processing device to repeatedly:
  generate the polynomials for the target object and the weighted combination of the polynomials for the target object over time; and
  determine whether the collision between the host vehicle and the target object is possible based on the weighted combination of the polynomials for the target object.

24. The non-transitory machine-readable medium of claim 17, further containing instructions that when executed cause the at least one processing device to repeatedly:
  generate multiple polynomials for multiple target objects and weighted combinations of the multiple polynomials for the multiple target objects over time; and determine whether a collision between the host vehicle and any of the target objects is possible based on the weighted combination of the polynomials for the multiple target objects.

* * * * *